(No Model.)
3 Sheets—Sheet 2.
J. HARRINGTON.
ROTARY CUT-OFF VALVE.
No. 309,849. Patented Dec. 30, 1884.
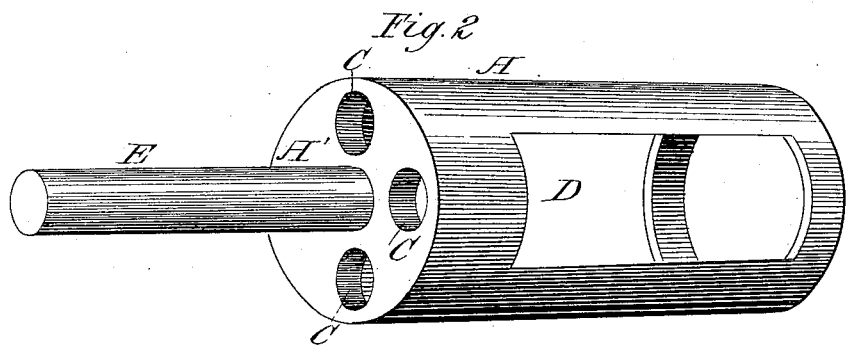
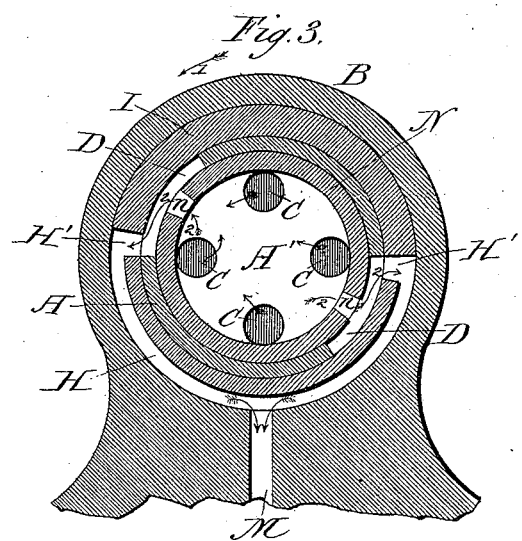
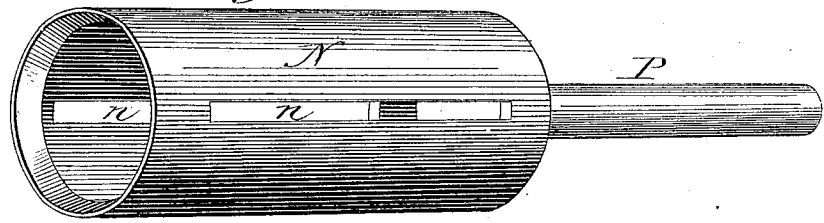

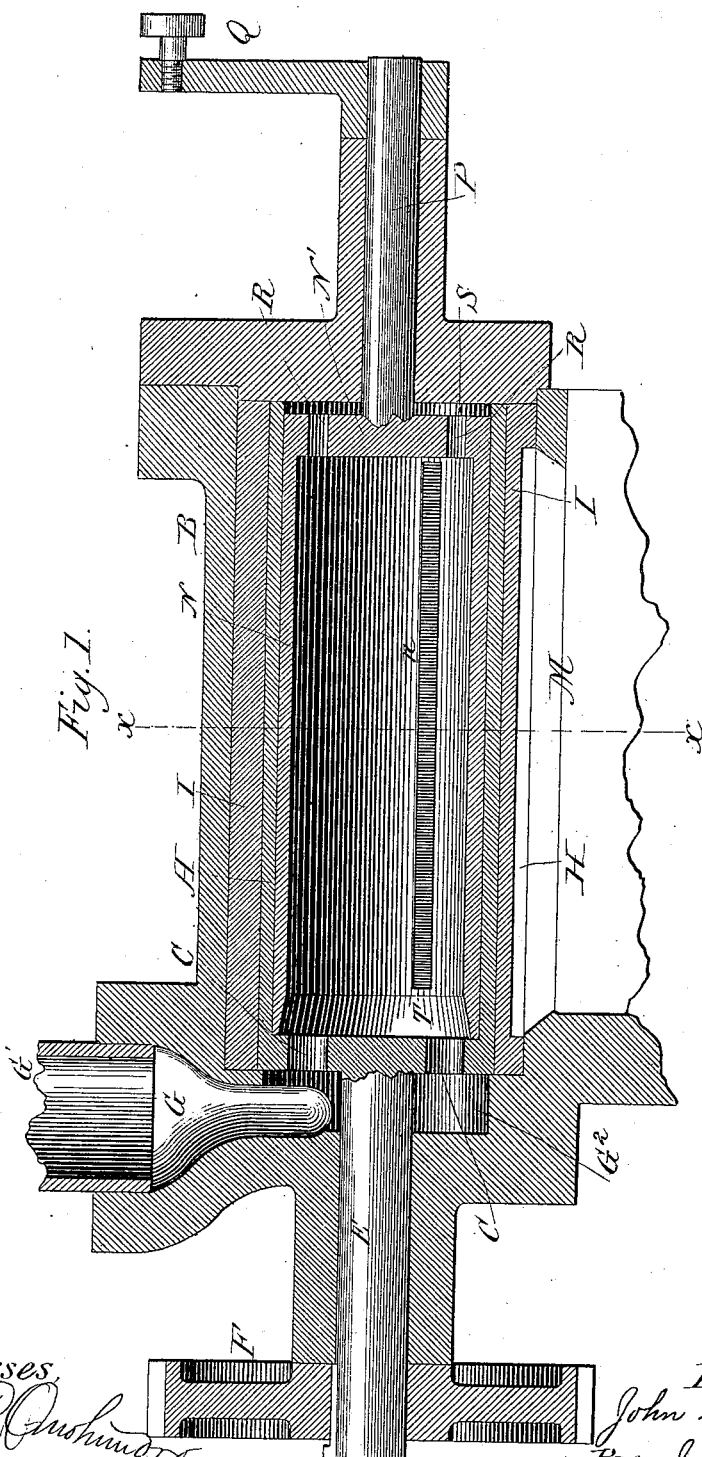

(No Model.)
J. HARRINGTON.
ROTARY CUT-OFF VALVE.
No. 309,849. Patented Dec. 30, 1884.
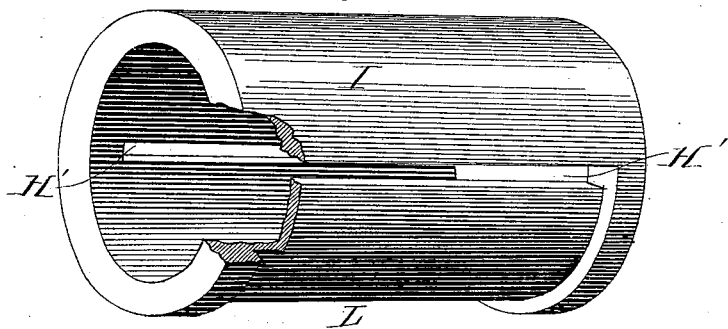
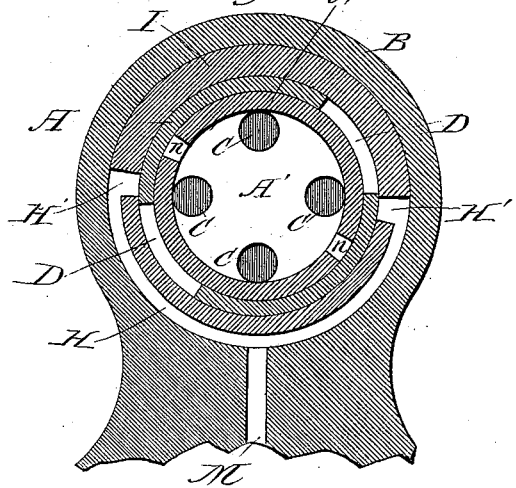
Witnesses
Inventor,
John Harrington
By Jno. G. Elliott
Atty.

UNITED STATES PATENT OFFICE.

JOHN HARRINGTON, OF CALDWELL, KANSAS.

ROTARY CUT-OFF VALVE.

SPECIFICATION forming part of Letters Patent No. 309,849, dated December 30, 1884.

Application filed April 25, 1884. (No model.)

*To all whom it may concern:*

Be it known that I, JOHN HARRINGTON, a citizen of the United States, residing at Caldwell, Sumner county, and State of Kansas, have invented certain new and useful Improvements in Rotary Cut-Off Valves, of which the following is a specification.

This invention relates to hollow rotary valves of that class in which the valve consists of a hollow rotary shell provided with steam-ports and driven from the engine. It further relates to that class of cut-offs for valves in which the cut-off is automatically regulated or adjusted from the governor, so as to cut off the steam at different points in the stroke.

The object of my invention is to steam-balance the hollow rotary valve, whereby a side pressure exerted by the expansive force of steam in one direction shall be counterbalanced by an opposing steam-pressure; also, to combine with a hollow rotary valve a novel and efficient automatic cut-off susceptible of a rotary adjustment through the medium of some suitable connection between the cut-off and the governor; also, to provide means for counterbalancing an end pressure exerted against the cut-off shell by the expansive force of the steam within the latter; and, further, to provide certain improved features of construction in hollow valves and adjustable cut-offs therefor, so as to render the same simple, efficient, and certain in action. These objects I attain by the devices hereinafter described and claimed, and illustrated in the annexed drawings, in which—

Figure 1 represents a central longitudinal section through a combined hollow rotary valve and adjustable cut-off constructed in accordance with my invention. Fig. 2 is a perspective view of the hollow valve. Fig. 3 is a transverse section through Fig. 1 on the line $x\ x$, and looking toward the inlet end of the valve. Fig. 4 is a perspective view of the cut-off shell. Fig. 5 shows in perspective an annular seating for the valve, a portion of the seating being broken away at one end. Fig. 6 is a section similar to Fig. 3, the valve-ports being shown open in Fig. 3 and closed in Fig. 6.

Referring by letter to the several figures of the drawings, in which like letters denote like parts, A indicates a hollow rotary valve, which is confined and arranged to operate within a suitably-constructed casing, B. This rotary valve consists of a hollow cylinder provided at one end with a head, A', which is perforated so as to form a suitable number of inlet ports or passages, C. Said hollow cylinder is also provided with two outlet ports or passages, D, which are respectively formed through the sides of the cylinder at points diametrically opposite each other. This hollow rotary valve is designed to be driven continuously from the engine, for which purpose it is provided at its perforated end with an axial stem or spindle, E, mounted in some appropriate bearing in or on the casing, and operated by any suitable arrangement of driving-gear, of which the latter, a gear-wheel, F, is herein shown keyed upon the outer end of the rotary stem or spindle. The end ports, C, of the hollow rotary valve are at all times in connection with a steam-passage through which steam is taken from the boiler, steam-chest, or other source of supply. This connection between the hollow valve and the boiler or other source of supply is conveniently attained by a passage, G, connecting at one end with a steam-supply pipe, G', and at its opposite end terminating in a chamber, G², formed within the casing at one end of the hollow valve, and communicating with the several end ports, C, of the latter. Steam-connection between the piston-cylinder and the side ports, D, of the rotary valve is established at intervals during the rotation of said valve through the medium of a semi-annular passage, H, connecting with the piston-cylinder, and arranged to take steam at two points respectively located at diametrically-opposite sides of the hollow cylindrical valve. In this way the side ports of the rotary valve will be simultaneously connected with the passage H at opposing points on a line taken diametrically through the rotary valve, in which way the pressure at one side of the valve will at all times be equalized by the pressure at the opposite side thereof, and as a result the rotary valve will be perfectly balanced. It will be seen under such arrangement that the side ports of the rotary valve will connect twice with the passage communicating with the piston-cylinder, and for this reason I propose operating the rotary valve under an arrangement of driving-gear or other operating mechanism which will effect one revolution of the valve for each two strokes of the engine, in which way at each stroke of the engine the valve performs a half-revolution, which allows live steam to be admitted to the piston-cylinder at each half-revolution of the rotary valve. The passage H can be arranged in several ways within the valve-casing, the preferred mode being to form the same between the inner wall of the casing and an annular cylindrical seating, I, in which the rotary valve is arranged to operate. Under this arrangement the annular seating is provided with two longitudinal slots or openings, H', arranged at points diametrically opposite each other in and through the seating, and between these two openings the seating is externally recessed for about one-half its circumference, as at L, Fig. 5, so that when the seating is fitted within the casing a semi-annular passage, H, is formed between the inner wall of the casing and the walls of the peripheral recess in the seating, which semi-annular passage terminates at its ends in short lateral ports or passages H', formed by slotting the seating longitudinally at points diametrically opposite each other, as hereinbefore described. The semi-annular passage H is intersected at a point intermediate of its ends by a passage, M, formed vertically through the lower portion of the casing, and designed to be connected in some suitable way with the piston-cylinder. In this way each half-revolution of the rotary valve will bring its two side ports into connection with a passage communicating with the piston-cylinder, and as the points of connection between the valve-ports and the passage are at points at diametrically-opposite sides of the rotary valve it will be evident that the pressure exerted by the expansive force of the steam against the rotary valve at opposite sides thereof will at all times counterbalance or neutralize each other, whether such pressures occur at a time when the valve-ports are in connection with the passage or when the valve-ports are out of connection with the passage and the plane face portion of the rotary valve-shell presented in opposition to the reactive or expansive force of steam within the passage after the cut-off.

The device for regulating the cut-off consists of a cylindrical shell, N, provided with two side ports or passages, $n$, formed longitudinally through the shell at points diametrically opposite each other. This cut-off shell is fitted to rotate in either direction within the hollow valve, and is controlled from the governor, which, through the medium of an intermediate connecting mechanism, serves to effect a rotary adjustment on the part of the cut-off shell, so as to bring it into position for varying the time of the cut-off. For this purpose the cut-off shell is provided at one end with a head, N', which serves to close one end of the hollow valve, and an axial stem or axle, P, extending outwardly from said head and operated from the governor through the medium of any suitable connecting mechanism, of which latter a crank-arm, Q, is shown secured upon one end of the stem or axle of the cut-off shell. Steam enters the cut-off shell through the end passages in the rotary valve, and passes out when the side ports in the rotary valve connect the side ports or passages in the cut-off shell with the entrances H' of a passage communicating with the piston-cylinder.

Assuming the side portions of the cut-off shell to be in the position shown in Fig. 3, and the valve to be rotating in the direction indicated by the arrow 1, and to have arrived at a juncture in its rotation where its side ports shall connect the ports in the cut-off shell with the entrances to a passage, H, it will be evident that the steam passing through the ports or passages as indicated by the arrow 2 will be cut off as soon as the valve-ports shall have passed the side ports or passages in the cut-off. If, now, by reason of the engine running at a high rate of speed, a rotary adjustment is given to the cut-off shell in a direction reversely to that indicated by arrow 1 in which the rotary valve is assumed to be revolving, the passages in the cut-off will be adjusted farther away from the entrances to the passage H which communicate with the piston-cylinder, and hence the cut-off will be made sooner and at a moment in the stroke depending on the extent of the rotary adjustment of the cut-off shell. A rotary adjustment of the cut-off shell reversely to that above—that is to say, an adjustment made in the direction indicated by arrow 1—serves to bring the passages in the cut-off nearer to the entrances to passages H connecting with the piston-cylinder, whereby the side ports of the revolving valve will establish a connection between passage H and the cut-off passages for a longer period, so as to cause the cut-off to take place later in the stroke. In this way the time at which the cut-off is made is dependent upon the relative distance between the passages in the cut-off shell and the points at which the passage connecting with the cylinder takes steam, it being obvious that the cut-off cylinder is susceptible of being adjusted from the governor of the engine when the latter is running at a high rate of speed to an extent which will automatically and entirely cut off steam from the piston-cylinder until the speed of the engine is slackened. The ports formed through opposite sides of the cut-off shell consist of long narrow slots or openings running longitudinally with the length of the shell. The side ports in the hollow rotary valve are formed similarly to the ports in the cut-off shell, but are made of a greater width, so that a side port of the valve shall have a greater area than a port of the cut-off shell. The sectional area of passage H is less than the area of either of the side ports in the hollow valve, and more nearly corresponds to that of either one of the ports in the cut-off shell. This semi-annular passage H is, however, intersected at a point between its ends by the vertical passage M in the casing, which latter passage should have a sectional area about equal to twice the sectional area of passage H, in which way the semi-annular passage is in effect two passages connecting with a single passage leading to or communicating with the piston-cylinder, and having a sectional area equal to the combined sectional areas of two passages which are afforded by the two parts of passage H leading from the vertical passage to opposite sides of the rotary valve. In order to counterbalance the end pressure exerted by the expansive force of the steam in the cut-off shell against the head at one end of the latter I provide said head with small passages R, connecting the interior of the cut-off shell with a steam-space, S, formed between this end of the shell and the casing. Steam admitted into this space exerts a pressure against the outer side of this end or head of the cut-off shell in direct opposition to the pressure exerted against the inner side of said end or head, and also counterbalances pressure exerted against the annular inner bevel, T, which is preferably formed at the opposite end of the cut-off shell, for the purpose of allowing more space for the end passages C of the hollow rotating valve.

Having described my invention, what I claim, and desire to secure by Letters Patent, is—

1. The hollow cylindrical valve provided with one or more ports and a series of end ports, and means for rotating said valve, in combination with a cylindrical cut-off shell fitting therein, and provided with one or more side passages of less diameter than the side ports of the valve, substantially as described.

2. The hollow cylindrical cut-off shell, the side passages thereof, and a passage leading to the cylinder of an engine, in combination with an intermediate rotary valve sleeved on said shell, and provided with side ports of a greater diameter than the side passages of the shell and the passage leading to the cylinder, substantially as described.

3. A hollow rotary valve provided with side ports and end passages, in combination with an automatic cut-off consisting of an inner shell provided with side passages of less area than the side ports of the valve, and having a rotary adjustment derived from the action of the governor, substantially as and for the purpose described.

4. As a means for steam-balancing a hollow rotary valve, the hollow rotary valve provided with end and side ports or passages, substantially as described, in combination with an external passage connecting with the piston-cylinder, and formed to connect with the rotary valve at the sides thereof at two points which are diametrically opposite each other, substantially as set forth.

5. The hollow rotary valve provided with side ports, and having at one end a steam passage or passages, in combination with the hollow cylindrical cut-off fitted within and adapted to close the opposite end of the hollow valve, and at said end communicating with an external steam-space, whereby counterbalancing pressures shall be exerted at one end of the cut-off shell, substantially as described.

6. The hollow rotary valve provided with end and side ports or passages, substantially as described, in combination with the casing and an annular seating for the rotary valve, provided with two side openings at points diametrically opposite each other, and having a semi-annular external recess between its said side openings, whereby a passage adapted to connect at two points with the hollow valve is formed, substantially as and for the purpose described.

JOHN HARRINGTON.

Witnesses:
W. W. ELLIOTT,
JNO. G. ELLIOTT.